(No Model.)

E. F. SHAW.
MEAT BROILER.

No. 268,736. Patented Dec. 5, 1882.

Witnesses.
F. L. Shaw
H. W. Stearns.

Inventor.
Edgar F. Shaw,
pr Norman W Stearns,
Attorney.

N. PETERS, Photo-Lithographer, Washington, D. C.

UNITED STATES PATENT OFFICE.

EDGAR F. SHAW, OF BOSTON, MASSACHUSETTS.

MEAT-BROILER.

SPECIFICATION forming part of Letters Patent No. 268,736, dated December 5, 1882.

Application filed April 15, 1882. (No model.)

*To all whom it may concern:*

Be it known that I, EDGAR F. SHAW, of Boston, in the county of Suffolk and State of Massachusetts, have invented certain Improvements in Broilers for Meats, &c., of which the following is a full, clear, and exact description, reference being had to the accompanying drawings, making part of this specification, in which—

Figure 1:
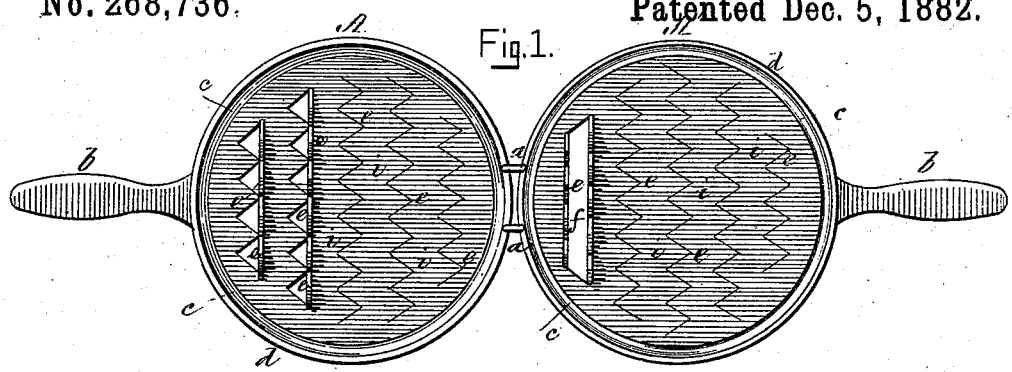
Figure 2:
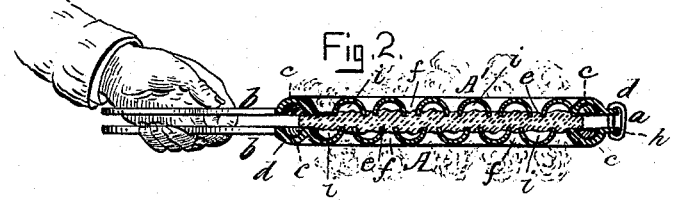
Figure 3:
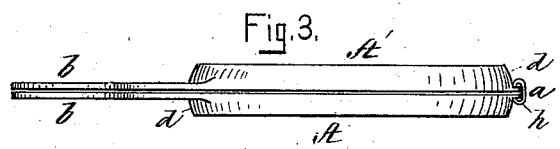
Figure 4:
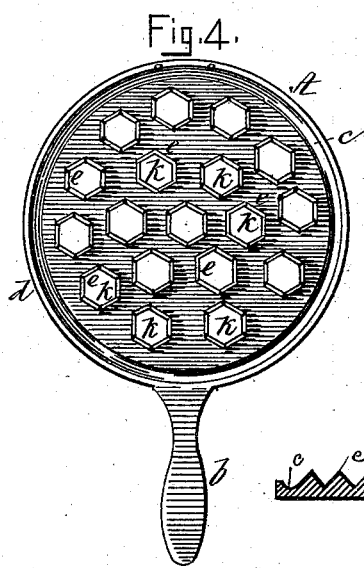
Figure 5:
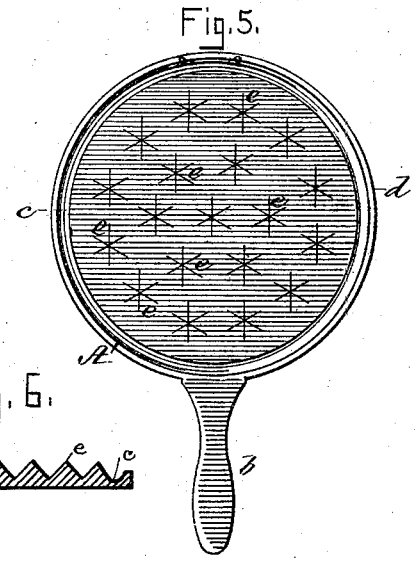
Figure 6:
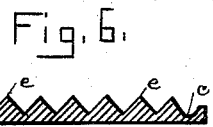

Figure 1 is a plan of an incompleted meat-broiler to be constructed in accordance with my invention, said broiler being composed of two portions hinged together and opened apart, said plan illustrating the successive stages of its construction. Fig. 2 is a vertical section through the center of one of my completed broilers, with the two portions closed together and with a piece of meat between them. Fig. 3 is an elevation of the two portions of the broiler closed together, showing the hinge-connection between them; Figs. 4 and 5, details representing a modification of my invention. Fig. 6 is a sectional detail to be referred to.

The object of my present invention is to dispense with the "steak-greith" or other devices usually employed in rendering meats tender before they are applied to the ordinary broiler; and this invention consists in a broiler having a series of projections of triangular or saw-tooth shape, so arranged as to form a series of inverted triangular-shaped spaces between contiguous projections of the same series or row, said projections penetrating the meat placed between them, a series of openings through the bottom of the broiler on one side of the lines of the rows of said projections for the fire to have access to the meat, a series of channels between said projections on the other side of the lines of their rows for the reception of the gravy, and an annular channel at or near the periphery of the outer edge of the bottom for the gravy in the previously-mentioned channels to empty therein, by which construction the two results sought for—viz., the tender condition of the meat and the broiling thereof—are both accomplished at one operation, whereas said results have heretofore been produced by the combined use of the steak-greith and the ordinary broiler, which involved two separate operations.

In the said drawings the broiler is represented as being composed of two dish-shaped portions, A A', of the same size and form, connected by a hinge, *a*, and each provided with a handle, *b*. The interior of each portion has an annular depression or channel, *c*, at its bottom at the junction therewith of the inclined annular side, *d*, of said portion. Extending up from the interior of the bottom of each portion A or A' are several series of pointed projections, *e*, of triangular or saw-tooth shape, with similar-shaped inverted spaces between them, (see Fig. 6,) arranged in rows or lines, reaching across that portion of the broiler within and terminated by the annular outside channel, *c*, two parallel contiguous rows of projections *e* being separated by an open space, *f*, from the adjacent pair of rows of projections, through which spaces the heat or fire is enabled to act upon the meat, located on the projections *e* of one portion, A, of the broiler, the other portion, A', being swung over the portion A to cover the meat and exerting a sufficient pressure thereon to cause the projections *e* to enter and puncture it, thereby increasing its tenderness. Near the upper edge of each portion A A' are formed two holes for the passage of a wire, *h*, (see Fig. 1,) constituting a reversible hinge, by which either portion may be placed over or under the other portion to utilize either side of the same, as may be desired. Instead of a hinge of this description, one may be formed by lips (projecting from each portion) inclosing a wire. Instead of locating the projections of one portion so as to bring them in line with the points of the projections of the other portion which covers it when the meat is interposed, the projections of one may be so located as to alternate with those of the other portion, in which case the point of each projection of one would be in line with the center of the space between two adjacent projections of the other, thereby increasing the extent of the penetrating surface and enhancing the quality of the meat. The part of the bottom of each portion lying between two contiguous rows of projections *e* is intended to form a concave channel, *i*, the several channels *i* of the lower portion, A', conducting the gravy or juices of the meat into its outer annular channel, *c*, from which it may be poured into a platter.

Instead of the projections *e* being of the arrangement shown in Figs. 1 and 2, they may be as shown in Figs. 4 and 5, there being six (6) triangular projections surrounding each opening k in the bottom of either or both portions. It is evident that one portion may be provided with some projections of one form and some of a different form, and they may be arranged in the same or in a different manner, and that one portion may be smooth—that is to say, have a continuous closed bottom of the present well-known style of fry-pan—the projections being dispensed with. Whether of cast or of sheet metal, the projections will be made integral with the portion to be provided with them. When of cast-iron, they are cast in one and the same piece therewith, and when of sheet metal they are formed by first using a punch of the desired number of cutting-edges, and then turning up the cut or separated portions.

Without departing from the spirit of my invention, I may employ one portion provided with projections of the desired form and some other suitable covering device, sufficient pressure being applied thereto to insure the cutting action of the projections on the meat between them; but I prefer the construction and arrangement previously described herein.

From the foregoing it will be seen that my improved broiler performs at one operation the two desired offices heretofore effected by the combined use of a steak-greith and an ordinary broiler.

I claim—

A steak-greith broiler having a series of projections, e, of triangular or saw-tooth shape, so arranged as to form a series of inverted triangular-shaped spaces between contiguous projections of the same series or row, a series of openings, f, through its bottom on one side of the lines of the rows of said projections, and a series of channels, i, between said projections on the other side of the lines of their rows, and an annular channel, c, at or near the periphery of the outer edge of the bottom, substantially as described.

Witness my hand this 25th day of March, 1882.

EDGAR F. SHAW.

In presence of—
N. W. STEARNS,
F. L. SHAW.